United States Patent [19]

Thomson

[11] 3,921,173

[45] Nov. 18, 1975

[54] ACCURATE NORMALIZATION FOR A MONOPULSE RADAR

[75] Inventor: Don N. Thomson, Haddonfield, N.J.

[73] Assignee: The United States of America as represented by the Secretary of the Navy, Washington, D.C.

[22] Filed: Aug. 14, 1974

[21] Appl. No.: 497,434

[52] U.S. Cl. ............................. 343/16 M; 343/17.7
[51] Int. Cl.² ............................................ G01S 9/22
[58] Field of Search ...................... 343/16 M, 17.7

[56] References Cited
UNITED STATES PATENTS

| | | | |
|---|---|---|---|
| 3,165,746 | 1/1965 | Whitnah | 343/16 M X |
| 3,243,815 | 3/1966 | Dynan et al. | 343/16 M X |
| 3,560,974 | 2/1971 | Lecourtier et al. | 343/16 M |
| 3,810,177 | 5/1974 | Tabourier | 343/16 M |

*Primary Examiner*—T. H. Tubbesing
*Attorney, Agent, or Firm*—R. S. Sciascia; P. Schneider; W. T. Ellis

[57] ABSTRACT

The invention comprises a system for controlling and normalizing the gain of the difference I.f. I.F. to the gain of the sum I.F. amplifier in a monopulse radar. A pulsed, I.F., pilot signal is applied to both the sum and difference I.F. amplifiers at predetermined intervals chosen so that the pilot signal does not interfere with the echo return signal. The outputs from these I.F. amplifiers are gated at the predetermined intervals coinciding with the application of the I.F. pilot signal. These gated, sum-and difference-amplifier, pilot signals are envelope-detected and then applied to a differential amplifier. This differential amplifier generates a signal representative of the difference between the sum and difference amplifier pilot signals and applies this signal to the difference, I.F. amplifier to control its gain.

The sum I.F. amplifier has a conventional A.G.C. system for gain control. The control signal generated by this conventional A.G.C. system is also applied to a circuit for controlling the signal level of the I.F. pilot signal so it is inversely proportional to the signal gain level of the sum I.F. amplifier. This controlled I.F. pilot signal is then applied to the sum and difference I.F. amplifiers (as stated above) via a hybrid network and directional couplers, at a time chosen so that it does not interfere with the predicted echo-return.

13 Claims, 2 Drawing Figures

ACCURATE NORMALIZATION FOR A MONOPULSE RADAR

FIELD OF THE INVENTION

The present invention relates generally to monopulse radar systems and in particular to a gain control and normalization system for a monopulse radar.

DESCRIPTION OF THE PRIOR ART

Target-tracking radars using mechanically scanned antennas often employ amplitude-comparison monopulse to determine the position of a target. The amplitude-comparison monopulse technique consists in the use of two offset, but overlapping, antenna beams to receive the echo return from a single pulse (monopulse). The R.F. signals received from these two offset antennas are combined so that both the sum and difference signals are obtained simultaneously. These sum and difference signals are then multiplied in a phase-sensitive detector to obtain both the magnitude and the angular error in one coordinate. A cluster of four antennas may be used if both elevation- and azimuth-error signals are desired.

A simplified block diagram of a typical monopulse system given by way of example and to serve as a setting for the description of the present invention is shown in FIG. 1. R.F. signals are taken from two antennas 10 and 11 and applied to a hybrid junction 12, such as a "magic T", a "rat race", or a short-slot coupler to obtain the sum ($Vs$) and the difference ($Vd$) signals. The sum signal, $Vs$, is used for transmission and is thus connected through a directional coupler 14 to a transmitter 15. The difference signal, $Vd$, and the sum signal, $Vs$, are applied to their respective mixers 16 and 18 where they are heterodyned with a local oscillator frequency from the oscillator 20 to obtain intermediate frequencies. The sum and difference intermediate frequencies are pre-amplified by the pre-amplifiers 24 and 22 respectively. The outputs from the pre amplifiers 24 and 22 are coupled to the inputs of the I.F. amplifiers 28 and 26 respectively for intermediate-frequency (I.F.) amplification. The output voltage, $V_1$, from the difference I.F. amplifier 26 is applied to an electronic gate 30. The output voltage, $V_2$, from the sum I.F. amplifier 28 is applied to an electronic gate 32. The output from the gate 32 is applied to a range tracking loop 40. The range tracking loop makes the target range measurement. Range tracking loops are well known in the art and a typical range-tracking loop configuration is discussed in the "Radar Handbook" by M. I. Skolnick, McGraw-Hill 1970, p. 21–41. The range tracking loop 40 predicts the target-echo return time and applies a signal on line 42 to the two gates 30 and 32 to open these gates during this predicted, return-time interval. Such an early-late range gate system is made necessary in order to avoid false, target-echo, detection caused by noise spikes and pulses from adjacent radar systems. A typical early-late range gate system is described in Skolnick's Radar Handbook p. 21–40 supra.

The sum I.F. output signal, $V_2$, is also applied to an automatic gain control (A.G.C.) system composed of an envelope-detecting diode 34 and a differential amplifier 36. The differential amplifier 36 generates a control signal representative of the difference between this detected envelope and a reference voltage, $Vr$. This control signal is applied back to the two I.F. amplifiers 26 and 28 to control their gains.

The sum I.F. output signal, $V_2$, is also applied to the reference input of a phase detector 38. The difference I.F. output signal, $V_1$, is applied through the gate 30 to the other input of the phase detector 38. The voltage developed at the output of the phase detector 38 has a magnitude proportional to the off-boresight angular error and has a sign proportional to the error direction for that particular coordinate.

It is essential in order to obtain an accurate angular error signal from the phase detector 38, that the output, $V_o$, from the phase detector 38 be independent of the target-signal amplitude. Then, if the antenna sum and difference patterns are known as a function of the angle-off of boresight, $V_o$ is a good measure of the target position.

In order to have the output, $V_0$, independent of the target-signal amplitude, the two I.F. amplifiers 26 and 28 must be identical so that when a control signal is received from the A.G.C. system 36, both I.F. amplifiers are attenuated by the same number of db. In practice, however, the two I.F. amplifiers are not identical. Thus, when the A.G.C. system 36 attenuates the sum I.F. amplifier 28 by a certain number of db., it may attenuate the difference I.F. amplifier by several db. more or less. Then the relation between the output, $V_o$, and the off-boresight angle is a function of input-signal level.

Since mechanically scanned, tracking radars (usually employed to track a single target) apply the angle-error signal, $V_0$, to their servo loops in order to keep the antenna boresight axis aligned with the target, the antenna position will tend to lag the target position if the target is moving in either azimuth or elevation.

Thus antenna tracking of a moving target is inaccurate to a certain degree due to this imperfect gain control of the I.F. amplifiers.

SUMMARY OF INVENTION

Briefly, the present invention obviates the radar-tracking-error problem in a monopulse, radar system due to non-identical I.F. amplifiers in the sum and difference channels. The sum and difference I.F. amplifiers are normalized by applying an I.F. pilot signal to each channel at predetermined intervals chosen so as not to interfere with the predicted echo-return signal. A differential A.G.C. system connected to the outputs of the sum and difference I.F. amplifiers receives these I.F. amplified pilot signals and generates a difference signal representative of the difference between the outputs from the sum and difference I.F. amplifiers. This difference signal is applied to the difference I.F. amplifier to control and normalize its gain to that of the sum I.F. amplifier.

The sum I.F. amplifier has a conventional A.G.C. system for gain control. The control signal generated by the conventional A.G.C. system is also applied to an inverse A.G.C. system. This inverse A.G.C. utilizes this control signal to control the signal level of the I.F. pilot signal so that it is inversely proportional to the signal level of the sum, I.F. amplifier. This inverse relationship of the pilot signal to the sum I.F. amplifier is for the purpose of preventing I.F. amplifier saturation while permitting envelope detection in an efficient manner.

OBJECTS OF THE INVENTION

An object of the present invention is to increase the accuracy of the target tracking by a monopulse radar.

A further object is to provide a more accurate off-boresight position of the target in a monopulse tracking system.

A still further object is to make the output error voltage from the phase detector of the monopulse radar independent of the input signal level.

A still further object is to control the gains of the I.F. amplifiers in a monopulse system so that they are identical.

Other objects, advantages, and novel features of the present invention will become apparent from the following detailed description of the invention when considered in conjunction with the accompanying drawings.

BRIF DESCRIPTION OF THE DRAWINGS

DETAILED DESCRIPTION OF THE INVENTION

Figure 1:
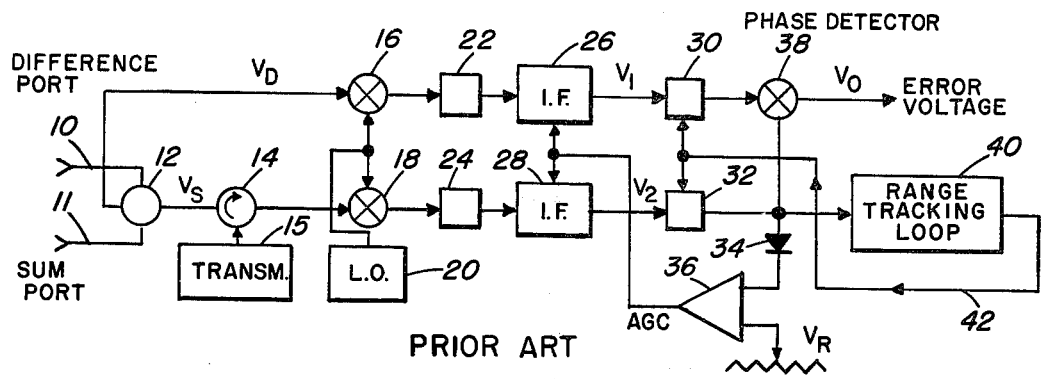
FIG. 1 is a schematic block diagram of a prior art monopulse radar system.
Figure 2:
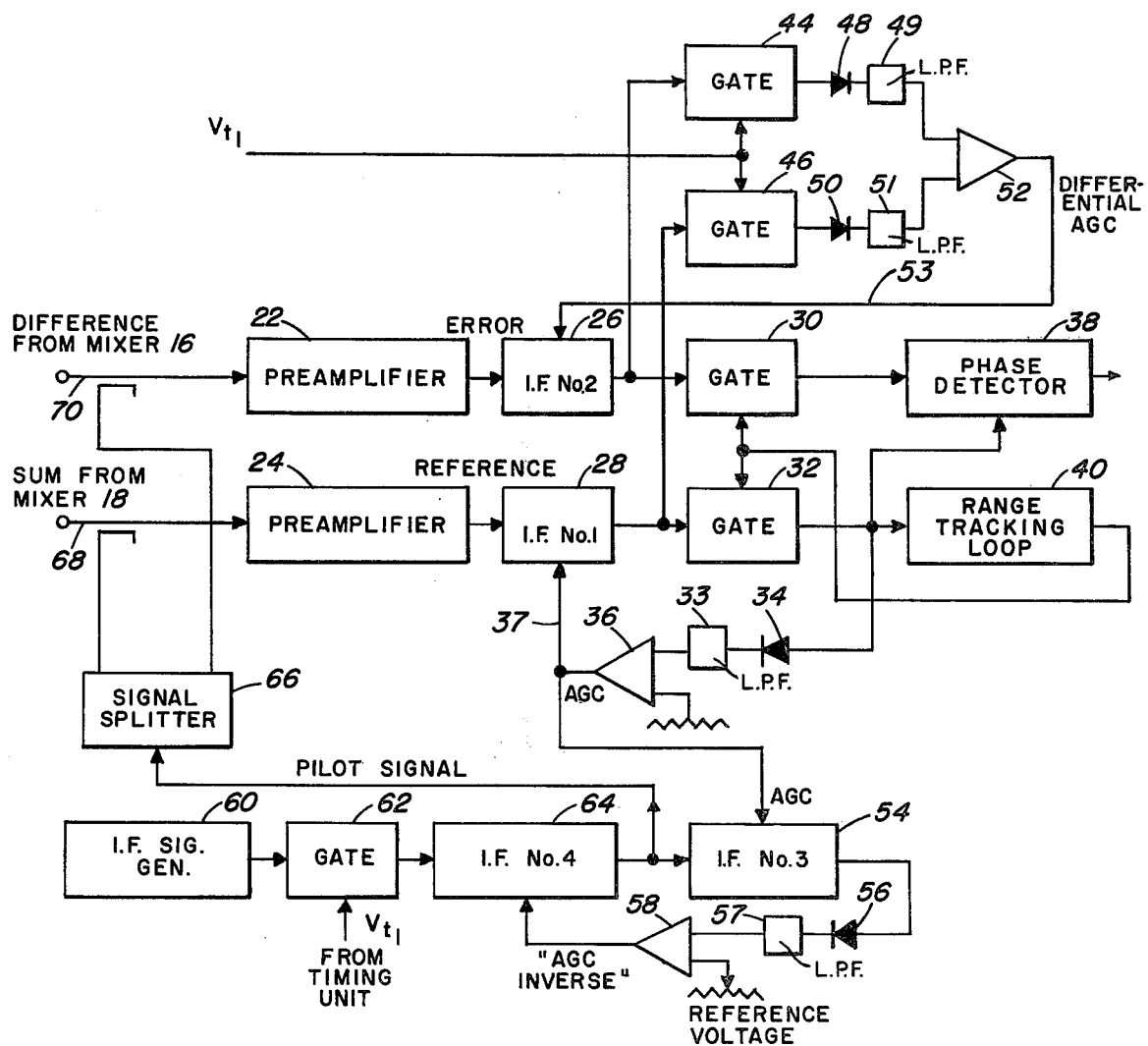
FIG. 2 is a schematic block diagram of an embodiment of the gain control circuit of the present invention.

FIG. 2 is a schematic block diagram of the present invention incorporated into a monopulse radar system. Since the first section of the monopulse system, from the antennas 10 and 11 up to the preamplifiers 22 and 24, is identical to that of FIG. 1, FIG. 2 shows only that part of the system beginning with the preamplifiers 22 and 24.

As can be seen from FIG. 2, the difference signal from the mixer 16 is again applied through the preamplifier 22 to I.F. amplifier 26. The output from the I.F. amplifier 26 is applied to an electronic gate 30. The gate 30 applies its output to a phase detector 38.

The sum signal from the mixer 18 is applied through the preamplifier 24 to the I.F. amplifier 28. The output from the I.F. amplifier 28 is applied to an electronic gate 32. The gate 32 applies its output to the range tracking loop 40 which predicts the target-echo-return time and applies a control signal to the gates 30 and 32 to open them at the predicted, target-echo-return time.

The sum channel employs a conventional A.G.C. loop to effect a gain control. Thus, the range-gated target signal from the gate 32 is applied through an envelope-detecting diode 34 and through either a low-pass filter or a box-car circuit 33 to produce a DC signal. This DC signal is applied as one input to a differential amplifier 36. A reference voltage is applied to the other input of the differential amplifier 36 which generates a control signal proportional to the difference between the detected envelope from the diode 34 and the reference voltage and applies the control signal to control the gain of the I.F. amplifier 28.

The gain control of the I.F. amplifier 26 is obtained in an entirely different manner since it is desired that the gain of the amplifier 26 be normalized to the gain of the amplifier 28. This gain control and normalization of the gain of the amplifier 26 to the gain of the amplifier 28 is effected by feeding into both channels (sum and difference) a pulsed pilot signal. A pilot signal must be used because the sum and difference channels have, by definition, different signals applied to their respective I.F. amplifiers. The time, $t_1$, of the pilot-pulse application is chosen in order not to interfere with the target return signal. The time generally chosen is the maximum range time. The timing signal, $V_{t_1}$, is normally derived from the master timing of the radar by putting a signal representing the main-bang pulse of the radar through a delay multivibrator so that the timing signal may be set at the desired point. Obviously, the multivibrator may be set to generate the signal at any point in the range-tracking period except for the predicted, echo-return, time-period during which the gates 30 and 32 are open.

The outputs from the I.F. amplifiers 26 (difference) and 28 (sum) are gated by the gates 44 and 46 respectively, at the time position $t_1$ of the pilot pulse. The difference-channel pilot signal is rectified by the diode 48 and sent through either a low pass filter or a boxcar circuit 49 to produce a DC signal and then applied to one input of a differential amplifier 52. The sum-channel pilot signal is rectified by the diode 50 and sent through a low pass filter or boxcar circuit 51 to produce a DC signal and them applied as the other input of the differential amplifier 52. The differential amplifier 52 generates a control signal proportional to the difference between the rectified, sum and difference channel, pilot signals and applies this control signal to the I.F. amplifier 26 to control its gain. This is referred to as a differential A.G.C. Thus the two I.F. amplifiers 26 and 28 may be quite different, yet the differential A.G.C. will force the gains of the two amplifiers to be the same. It is only required that the open loop gain of the difference-channel I.F. amplifier 26 equal or exceed that of the sum-channel amplifier 28.

A problem arises with the use of an injected pilot signal in that when the I.F. amplifiers are at low gain levels due to the presence of a strong, target-return signal, the injected pilot may be at such a low level that it cannot be properly and efficiently detected by the diodes 48 and 50 above the system noise.

Likewise, when the I.F. amplifiers are at high gain levels due to a very weak, target-return signal, the injected pilot may be amplified to such an extent that it saturates the I.F. amplifiers 26 and 28.

Thus, it is desired that the pilot signal, as measured at the outputs of the difference and sum amplifiers 26 and 28, be relatively constant. This objective is accomplished by using a reverse A.G.C. system. This reverse A.G.C. system operates as follows. An I.F. signal generator 60 generates an I.F. signal and applies it to an electronic gate 62. This gate 62 is controlled by the timing signal, $V_{t_1}$, so that an I.F. pilot pulse is passed by the gate only at the predetermined intervals set by the signal $V_{t_1}$. These pulsed, I.F., pilot signals are applied to an I.F. amplifier 64 whose output is applied to the input of an I.F. amplifier 54. The A.G.C. control signal generated by the differential amplifier 36 for gain control of the I.F. amplifier 28 is also applied to the I.F. amplifier 54 to control its gain. The output of the I.F. amplifier 54 is applied to an envelope-detecting diode 56 and to either a low pass filter or a boxcar circuit 57 to produce a DC signal. This DC signal is applied to the input of a differential amplifier 58. A reference voltage is applied to the other input of the amplifier 58. The differential amplifier 58 compares the detected envelope to the reference voltage and generates a signal representative of the difference between these two signals. This output signal from the amplifier 58 is applied to the I.F. amplifier 64 to control its gain. The I.F. amplifier 64 may be either an amplifier or an electronically controlled attenuator.

The inverse-A.G.C.-controlled pilot signal of the I.F. amplifier 64 is applied via a signal splitter 66 and directional couplers 68 and 70 to the input line of each of the preamplifiers 22 and 24 to provide the pilot signal for the differential A.G.C. The splitter 66 may be, for example, a 3db. ferrite hybrid splitter made by Technical Research and Manufacturing, Inc.

By inspection, it can be seen that the pilot A.G.C. system (amplifier 58 and diode 56) forces the I.F. amplifier 64 to do the inverse of what the I.F. amplifier 54 is doing. This is accomplished as follows. When the I.F. amplifier 28 is held at a low gain by the control signal from the A.G.C. differential amplifier 36 due to a strong, target signal, the I.F. amplifier 54 is held to an equally low gain due to its reception of the same control signal. The low-gain output from the I.F. amplifier 54 is compared to a reference voltage in the differential amplifier 58 and a control signal is generated by this amplifier to increase the gain of the I.F. amplifier 64. Thus the pilot-pulse level is increased to a sufficient level so that detection problems at the envelope-detecting diodes 48 and 50 caused by the low gains from the amplifiers 26 and 28 are obviated.

Likewise, when the I.F. amplifier 54 is raised to a high gain, the I.F. amplifier 64 is dropped to a low gain. Thus the pilot-pulse level is decreased sufficiently so that the high gain of the amplifiers 26 and 28 will not cause them to go into saturation upon reception of the pilot pulses.

It is to be understood, of course, that FIG. 2 is a diagram of only one error channel. Obviously, a second gain control and normalization system may be used to control the other channel.

Using this system, the sum and difference channels of the monopulse radar can be controlled to within ± ¼ db. This is an order of magnitude better than that achieved by the system of FIG. 1. Differential gain control of approximately ± 0.1 db. is feasible with conventional techniques.

The above discussed normalization technique, although discussed in the context of an amplitude comparison system, may also be used in a phase-comparison, monopulse radar. The systems are very similar. A description of a typical, phase-comparison, monopulse system may be found in Skolnick's Radar Handbook at pages 21–27 and 21–28 supra. Phased array radars are normally used in a track-while-scan mode. The limited time-on-target prevents the use of a conventional A.G.C. Thus, the A.G.C. system comprising the diode 34 and the amplifier 36 may not be used to control the gain of the sum I.F. amplifier 28. A computer is generally used in place of this sum A.G.C. system to adjust the gain of the sum I.F. amplifier 28 (in accordance with the range of the target) in order to keep the signals within the dynamic range of the sum I.F. amplifier. Thus, a block labeled "computer" may be substituted in place of the amplifier 36 and diode 34 in the A.G.C. feedback line 37.

In modern radars the gain control is often accomplished by digital attenuators placed between the preamplifiers 22 and 24 and their respective I.F. amplifiers 26 and 28. Very close matches may be obtained through the use of such attenuators. The A.G.C. line 37 (with either the conventional A.G.C. blocks 34 and 36 or a computer) is merely applied to the sum attenuator instead of the sum I.F. amplifier. Likewise, the differential A.G.C. line 53 is applied to the difference attenuator instead of the difference I.F. amplifier 26.

In summary, the differential A.G.C. system in combination with the inverse A.G.C. system act to normalize the difference I.F. amplifier to the sum I.F. amplifier thus assuring channel-gain equality under all conditions. This channel-gain equality substantially minimizes calibration and alignment problems.

Obviously, many modifications and variations of the present invention are possible in light of the above teachings. It is therefore to be understood that, within the scope of the appended claims, the invention may be practiced otherwise than as specifically described.

What is claimed is:

1. An automatic gain control and normalization system for equalizing the gains of the sum and difference I.F. amplifiers in a monopulse radar system comprising:
    first I.F. amplifier means;
    second I.F. amplifier means;
    means for generating an I.F. difference voltage and an I.F. sum voltage from the R.F. signals from a plurality of antennas in a monopulse radar system and applying the I.F. difference voltage as an input to said first I.F. amplifier means and applying the I.F. sum voltage as an input to said second, I.F. amplifier means;
    third I.F. amplifier means;
    first A.G.C. means, with its input coupled to the output of said second I.F. amplifier means, for generating a control signal, and applying the control signal to said second I.F. amplifier means and to said third I.F. amplifier means to control their signal levels;
    means coupled to said first A.G.C. means for preventing the latter from responding to any signal except an I.F. sum signal;
    fourth I.F. amplifier means with its output coupled to the input of said third I.F. amplifier means;
    signal generator means for generating an I.F. pilot signal and applying this I.F. pilot signal to said fourth I.F. amplifier means at predetermined intervals chosen so that said pilot signal does not interfere with an I.F. sum or difference voltage;
    second A.G.C. means, with its input coupled to the output of said third I.F. amplifier means, for comparing its input signal to a reference, generating a control signal, and applying this control signal to said fourth I.F. amplifier means to control its gain such that it is inversely proportional to the gain of said third I.F. amplifier means;
    means for electrically coupling the output signal from said fourth I.F. amplifier means to the inputs of said first and said second I.F. amplifier means;
    first gate means with its input coupled to the output of said first, I.F. amplifier means;
    second gate means with its input coupled to the output of said second I.F. amplifier means, said first and second gate means being open only during the predetermined times when said I.F. pilot signal is generated by said signal generator means; and
    comparing means connected to the outputs from said first and said second gate means for comparing their signal outputs and applying an error signal to said first I.F. amplifier means to control its signal level.

2. An automatic gain control and normalization system as defined in claim 1, wherein said signal generator means comprises:
    an I.F. signal generator; and
    a gate to which the I.F. pilot signal generated by said signal generator is applied and to which a timing signal is applied to open the gate at predetermined intervals.

3. An automatic gain control and normalization system as defined in claim 1 wherein said first and second A.G.C. means comprise:
 a differential amplifier, said differential amplifier having a reference voltage applied to one of its inputs; and
 envelope detecting means for detecting the envelope of the input signal and producing a DC signal from the envelope and applying this DC signal to the other input of said differential amplifier.

4. An automatic gain control and normalization system as defined in claim 1, wherein said comparing means comprises:
 a differential amplifier;
 first envelope detector means with its input connected to the output of said first gate means for detecting the envelope of this output and producing a DC signal from this envelope and applying this DC signal to one of the inputs of said differential amplifier;
 second envelope detector means with its input connected to the output of said second gate means for detecting the envelope of this output and producing a DC signal from this envelope and applying this DC signal to the other input of said differential amplifier.

5. An automatic gain control and normalization system as defined in claim 1, wherein said means to electrically couple the output signal from said fourth I.F. amplifier means is a hybrid circuit.

6. An automatic gain control and normalization system as defined in claim 1, wherein said first and second I.F. amplifier means are I.F. amplifiers.

7. An automatic gain control and normalization systems as defined in claim 1, wherein said first and second I.F. amplifier means each comprise:
 a digital attenuator to which said control signals are applied to provide signal level control by means of signal attenuation;
 an I.F. amplifier with its input coupled to the output of said digital attenuator.

8. An automatic gain control and normalization system for equalizing the gains of the sum and difference I.F. amplifiers in a monopulse radar system comprising:
 first I.F. amplifier means;
 second I.F. amplifier means;
 means for generating an I.F. difference voltage and an I.F. sum voltage from the R.F. signals from a plurality antennas in a monopulse radar system and applying said I.F. difference voltage as an input to said first I.F. amplifier means and applying said I.F. sum voltage as an input to said second I.F. amplifier means;
 target A.G.C. means, with its input coupled to the output of said second I.F. amplifier means, for generating a control signal, and applying this control signal back to said second I.F. amplifier means to control its signal level;
 means connected to said target A.G.C. preventing said target A.G.C. means from responding to any signal except an I.F. sum signal;
 means connected to the output from said target A.G.C. means for generating an I.F. pilot signal at predetermined intervals chosen so that said I.F. pilot signal does not interfere with said I.F. sum and difference signals, said I.F. pilot signal having a signal level inversely proportional to the signal level at the output of said second I.F. amplifier means;
 means for electrically coupling the I.F. pilot signal to the inputs of said first and said second I.F. amplifier means;
 differential A.G.C. means with one of its inputs connected to the output of said first I.F. amplifier means and with another of its inputs connected to the output of said second I.F. amplifier means, said differential A.G.C. means generating a difference signal representative of the difference between said first and second I.F. amplifier outputs only during the predetermined intervals during which said I.F. pilot signal is generated, said differential A.G.C. means applying this difference signal to said first I.F. amplifier means to control its gain.

9. An automatic gain control and normalization system as defined in claim 8, wherein said means for generating an I.F. pilot signal comprises:
 third I.F. amplifier means coupled to the output from said target A.G.C. means so that the target A.G.C. control signal controls the gain of said third I.F. amplifier means;
 fourth I.F. amplifier means with its output coupled to the input of said third I.F. amplifier means;
 signal generator means for generating an I.F. pilot signal;
 first gate means with its input coupled to the output of said signal generator means, and with its output connected to the input of said fourth I.F. amplifier means, said first gate means opening to permit the I.F. pilot signal to reach said fourth I.F. amplifier means only during said predetermined intervals;
 pilot A.G.C. means, with its input coupled to the output of said third I.F. amplifier means, for comparing this input signal to a reference voltage, generating a control signal, and applying this control signal to said fourth I.F. amplifier means to control its signal level.

10. An automatic gain control and normalization system as defined in claim 8, wherein said differential A.G.C. means comprises:
 first gate means with its input coupled to the output of said first I.F. amplifier means;
 second gate means with its input coupled to the output of said second I.F. amplifier means, said first and second gate means being open only during said predetermined times when the I.F. pilot signal is generated by said means for generating an I.F. pilot signal;
 comparing means connected to the outputs from said first and second gate means for comparing the signals from said first and second gate means and applying a control signal representative of the difference between the signals from said first and second gate means to said first I.F. amplifier means to control its signal level.

11. A method for controlling and normalizing the gains of the sum and difference I.F. amplifying means in a monopulse radar system comprising the steps of:
 applying an I.F. pilot signal to said sum and difference I.F. amplifying means at predetermined intervals chosen so that said pilot signal does not interfere with any echo return signals;
 generating a difference signal representative of the difference between the I.F. pilot signal output from said sum I.F. amplifying means and said difference I.F. amplifying means;
 applying this generated difference signal to said difference I.F. amplifying means to control and normalize its gain to that of the sum I.F. amplifying means;

generating a first control signal from the output of said sum I.F. amplifying only when an echo return signal is present and applying said first control signal back to control the signal level of said sum I.F. amplifying means; and utilizing said first control signal also to control the signal level of said I.F. pilot signal to that it is inversely proportional to the output signal level of said sum I.F. amplifying means.

12. A method as defined in claim 11 wherein said step of generating a difference signal comprises the steps of:

gating the output signals from said sum and difference I.F. amplifying means only at the predetermined intervals coinciding with the application of said I.F. pilot signal;

detecting the envelopes of these gated output signals;

filtering a DC signal from these detected envelopes;

generating a difference signal from said DC, signals representative of the difference between the gated sum-I.F.-amplifier, signal envelope and the difference-I.F.-amplifier, signal envelope.

13. A method as defined in claim 11 wherein said step of utilizing said control signal comprises the steps of:

generating an I.F. pilot signal;

gating said I.F. pilot signal at predetermined intervals to a first I.F. amplifier;

amplifying said I.F. pilot signal in said first I.F. amplifying means and applying said amplified I.F. pilot signal to a second I.F. amplifying means;

controlling the gain of said second I.F. amplifying means with said first control signal;

generating a second control signal from the output from said second I.F. amplifier;

applying said second control signal to said first I.F. amplifying means to control its gain;

applying the output from said first I.F. amplifying means to said sum and difference I.F. amplifying means.

\* \* \* \* \*